April 11, 1967     E. H. PERSON     3,313,380

PISTON DAMPENER

Filed April 5, 1965

3,313,380
PISTON DAMPENER
Ernest Hjalmar Person, New Britain, Conn., assignor to Allied Thermal Corporation, New Britain, Conn., a corporation of Connecticut
Filed Apr. 5, 1965, Ser. No. 445,557
2 Claims. (Cl. 188—86)

The present invention relates to snubbing or dampening devices and more particularly to an improved snubbing device of simple and inexpensive construction.

Dash pots are often employed as snubbing devices and usually include a piston within a cylinder. The construction is such that movement of the piston within the cylinder causes the passage of fluid from one side of the piston to the other. When the fluid is a gas such as air, the dimensions of the cylinder and piston must be held within very close tolerances to be practical. In some cases, the piston and cylinder must be machined and honed to within one ten-thousandths of an inch in order to function properly.

The principal object of this invention has been to provide a snubbing device that is of simple and relatively inexpensive construction.

Another object of the invention has been to provide such a device that is effective when forces are applied in either axial direction.

Still another object of the invention has been to provide such a device in which a piston and cylinder are employed with a gas or air medium on both sides of the piston, and which device does not require critical tolerances in its manufacture.

Another object of the invention has been to provide such a device in which the passage of air from one side of the piston to the other is restricted to a very small portion of the periphery of the piston and internal periphery of the cylinder.

In one aspect of the invention, the snubbing or dampening device may comprise a cylinder within which a piston is mounted for reciprocable movement. The piston may be attached to a rod extending from the piston, which rod is connected to the device the action of which is to be dampened.

In another aspect of the invention, the piston may include identical disks that are held together in opposed relation. Each disk may comprise a portion of reduced diameter joined to a portion of maximum diameter by an angular surface that increases in diameter from the portion of reduced diameter to the portion of maximum diameter.

In still another aspect of the invention, the piston when formed by the opposed abutting disks provides an annular groove having cam surfaces formed on each side of the abutting portion of reduced diameter.

In a further aspect of the invention, a ring preferably made from one of the fluorocarbons, is located within the annular groove of the piston. The ring is cut in two along a diameter, transversely and obliquely, in somewhat the way a piston ring is formed, although in this case the ring is cut into two separate segments.

In a still further aspect of the invention, the piston halves may be held together by a lock nut threaded onto the piston rod, and one end of the cylinder may be closed by a pressed-in plug.

Other and further objects, features and advantages of the invention will appear more fully from the following description of an illustrative embodiment of the invention taken in connection with the appended drawing in which.

Figure 1:
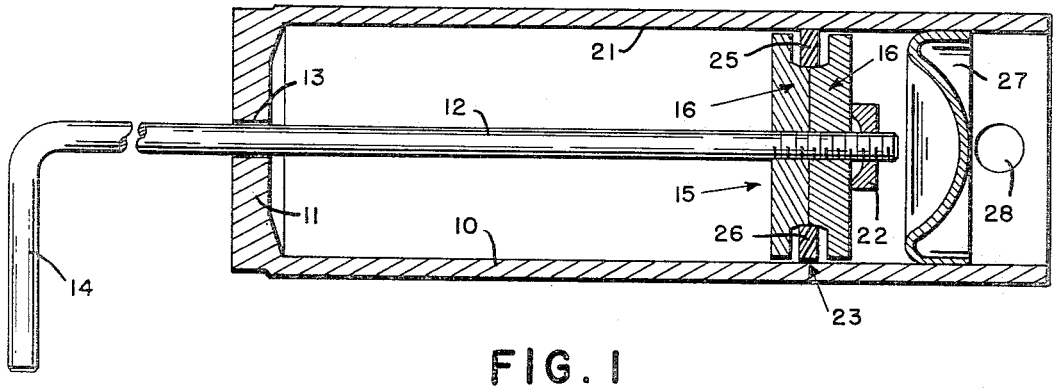
FIG. 1 is a sectional view of a dampening device to which the principles of the invention have been applied.

Referring to the drawing, the principles of the invention are shown as applied to a dampening device including a cylinder 10 having one end closed by a wall 11 that is shown as being integral with the cylinder 10. A rod 12 may extend through a hole 13 in wall 11 and it may have any desired end portion 14 capable of being connected to a device the movement of which is to be dampened.

The end of rod 12 within cylinder 10 may be threaded for receiving a split piston 15 which includes two identical disks 16 arranged in opposed abutting relation.

Figure 2:
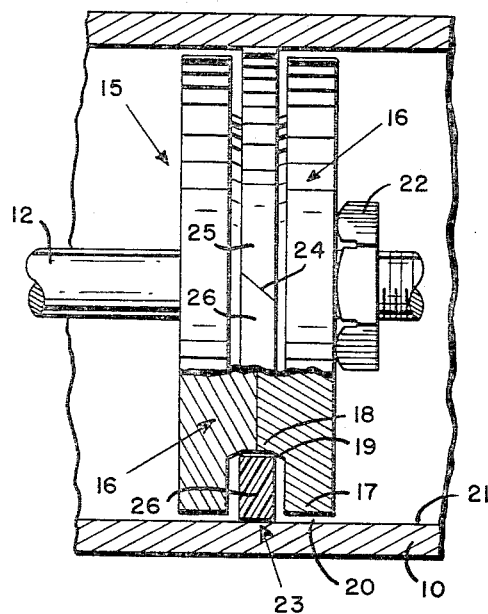
FIG. 2 is an enlarged view, partly in section, of a portion of the apparatus shown in FIG. 1.

Referring to FIG. 2, each disk 16 may include a portion 17 of maximum diameter and a portion 18 of reduced diameter. The reduced diameter portion 18 is joined to the portion 17 by a radially outwardly inclined cam surface 19 for a purpose to be described later. The outside diameter of the portion 17 may be such as to provide considerable clearance 20 between it and the inner peripheral surface 21 of cylinder 10. Each disk 16 is centrally drilled and tapped so that the disks can be threaded onto rod 12 and held in opposed abutting relation by a lock nut 22.

Figure 3:
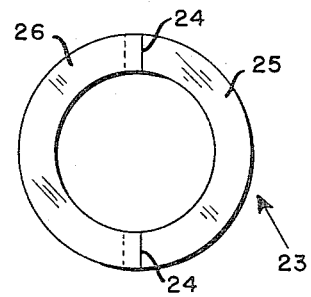
FIG. 3 is a plan view of a ring used in the invention.
Figure 4:
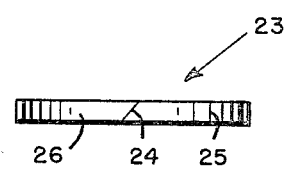
FIG. 4 is an edge view of the ring of FIG. 3.

Referring to FIGS. 3 and 4, a ring 23 may be located within the groove formed by the abutting portions 18 of disks 16. This ring 23 may be made of non-metallic material such as a copolymer of tetrafluoroethylene and hexafluoropropylene, e.g., the plastic known in the trade as "Teflon."

The ring 23 may be severed along a diameter on a transverse, oblique line 24, producing two separate mating segments 25 and 26. The external diameter of the ring 23 before cutting is such that it slidingly fits the internal diameter of cylinder 10, and the thickness of ring 23 is substantially equal to twice the width of the reduced diameter portion 18. The internal diameter of ring 23 before cutting is equal to the diameter of the reduced portions 18. The construction is such that upon application of force in either direction to the rod 12, the ring 23 cams up on the trailing cam surface 19, spreading the two segments 25 and 26 apart, thereby acting as a brake on the movement of rod 12. This spreading of segments 25 and 26 opens a restricted passage between the transverse, oblique separation line 24, through which the air on one side of the piston 15 passes to the other side in a restricted manner.

Referring again to FIG. 1, a cap or plug 27 is pressed into the open end of cylinder 10. An anchoring hole 28 is provided for attaching the cylinder to a supporting member.

While the invention has been described in connection with a specific embodiment thereof and in a specific use, various modifications thereof will occur to those skilled in the art without departing from the spirit and scope of the invention as set forth in the appended claims.

What is claimed is:

1. Apparatus comprising in combination, a cylinder; a piston rod extending into said cylinder; a piston connected to said piston rod within said cylinder, said piston including identical disks each having reduced diameter axially extending annular portions joined to portions of greater diameter by a radially outwardly flaring cam surface; means for holding two of said disks in opposed abutting relation with the reduced diameter portions in contact in all positions of said piston rod, thereby forming an annular groove about the periphery of said piston; and transversely split ring means within said annular groove and of a width substantially equal to that of the axially extending annular portions of said abutting disks, whereby when a force is applied in either direction to said rod, the segments of said ring means are cammed radially outwardly into contact with the inner peripheral surface of said cylinder.

2. Apparatus comprising in combination, a cylinder; a piston rod extending into said cylinder; a piston connected to said piston rod within said cylinder, said piston including identical disks each having reduced diameter axially extending annular portions joined to portions of greater diameter by a radially outwardly flaring cam surface; means for holding two of said disks in opposed abutting relation with the reduced diameter portions in contact in all positions of said piston rod, thereby forming an annular groove about the periphery of said piston; and transversely split ring means within said annular groove; said ring means being made of a copolymer of tetrafluoroethylene and hexafluoropropylene and of a width substantially equal to that of the axially extending annular portions of said abutting disks, whereby when a force is applied in either direction to said rod, the segments of said ring means are cammed radially outwardly into contact with the inner peripheral surface of said cylinder.

References Cited by the Examiner
UNITED STATES PATENTS

| | | | |
|---|---|---|---|
| 2,206,110 | 7/1940 | Myers et al. | 188—88 |
| 2,417,504 | 3/1947 | Knaggs et al. | 188—96 X |
| 3,062,555 | 11/1962 | Britton | 188—100 |
| 3,088,555 | 5/1963 | Karlgaard | 188—88 |
| 3,143,757 | 8/1964 | Quinn | 16—57 |
| 3,158,894 | 12/1964 | Quinn | 16—66 |

MILTON BUCHLER, *Primary Examiner.*

FERGUS S. MIDDLETON, *Examiner.*

G. HALVOSA, *Assistant Examiner.*